(No Model.) 7 Sheets—Sheet 1.
C. P. SLAGHT.
HAY RAKE AND LOADER.
No. 378,466. Patented Feb. 28, 1888.
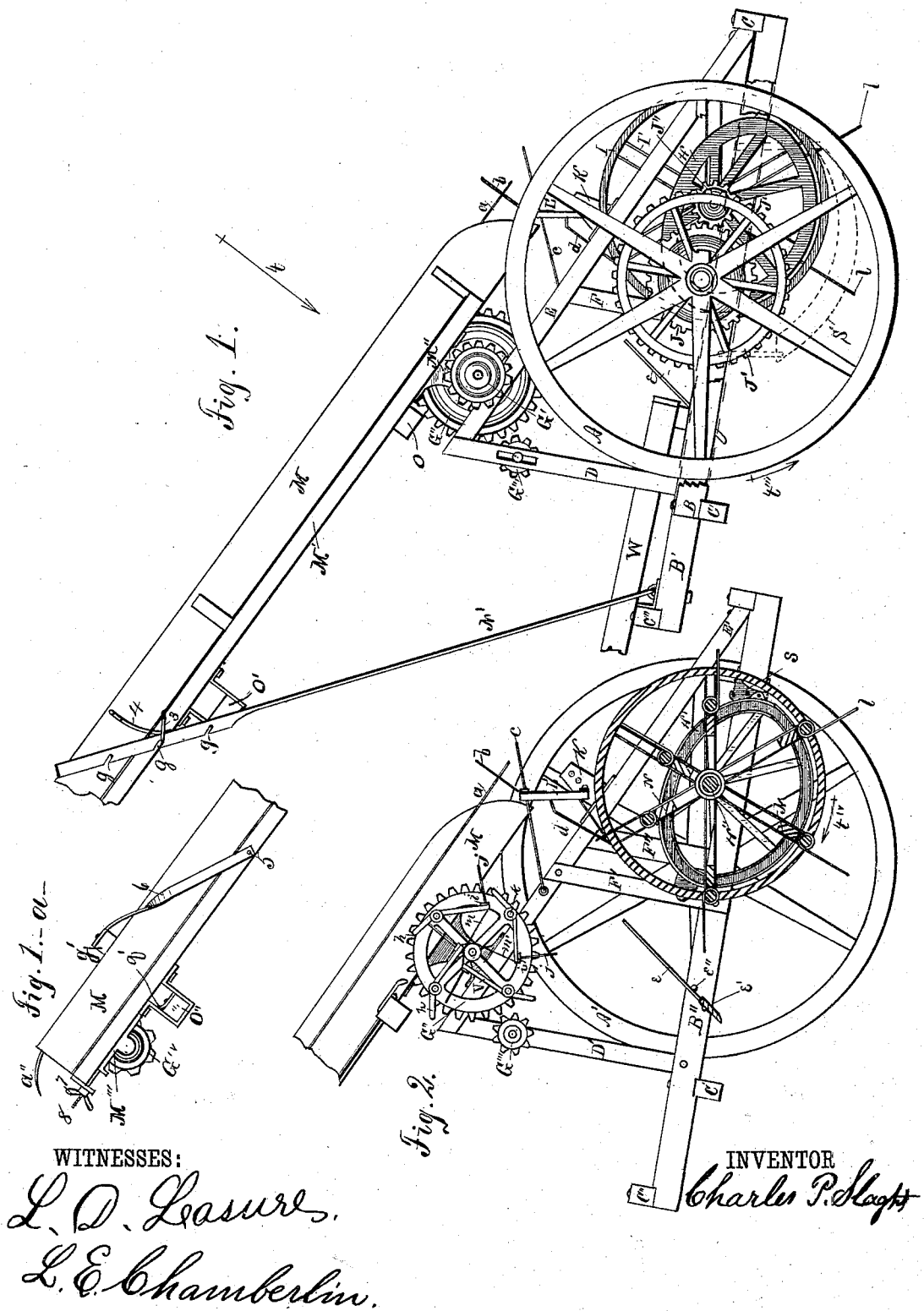
WITNESSES:
L. D. Leasure.
L. E. Chamberlin.
INVENTOR
Charles P. Slaght (No Model.) 7 Sheets—Sheet 2.

C. P. SLAGHT.
HAY RAKE AND LOADER.

No. 378,466. Patented Feb. 28, 1888.

WITNESSES:
L. D. Leasure
L. E. Chamberlin

INVENTOR
Charles P. Slaght (No Model.) 7 Sheets—Sheet 3.
C. P. SLAGHT.
HAY RAKE AND LOADER.
No. 378,466. Patented Feb. 28, 1888.
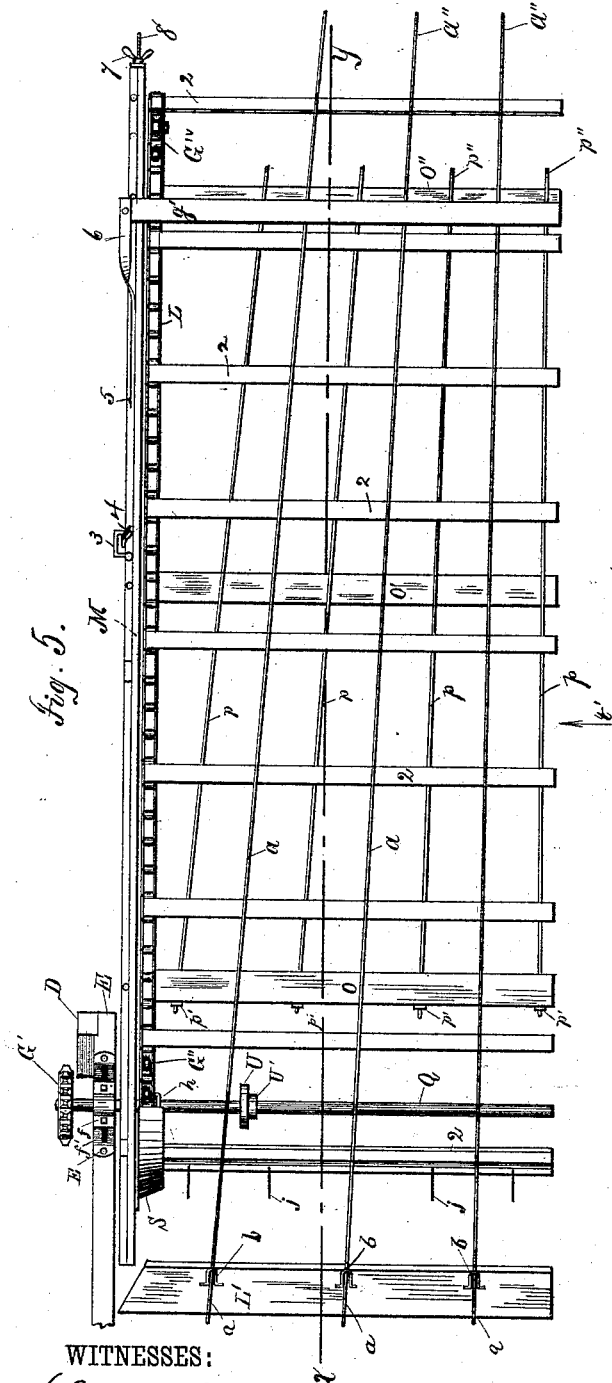
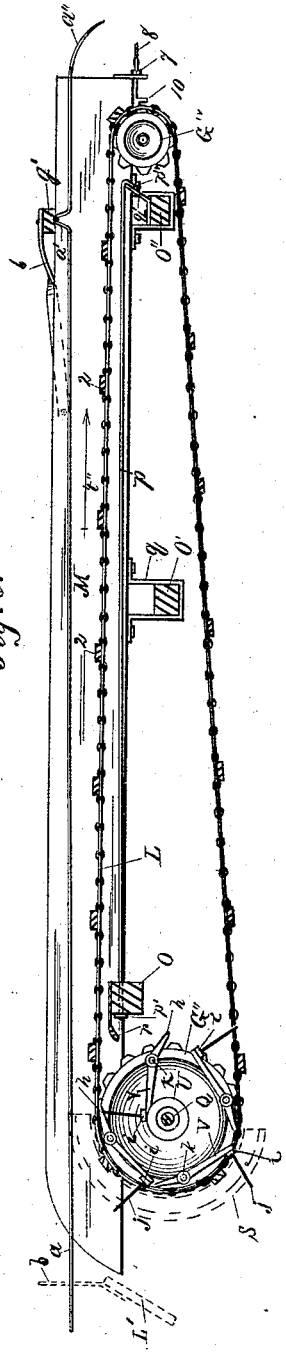
WITNESSES:
L. D. Leasure
Lewis E. Camberlin
INVENTOR.
Charles P. Slaght

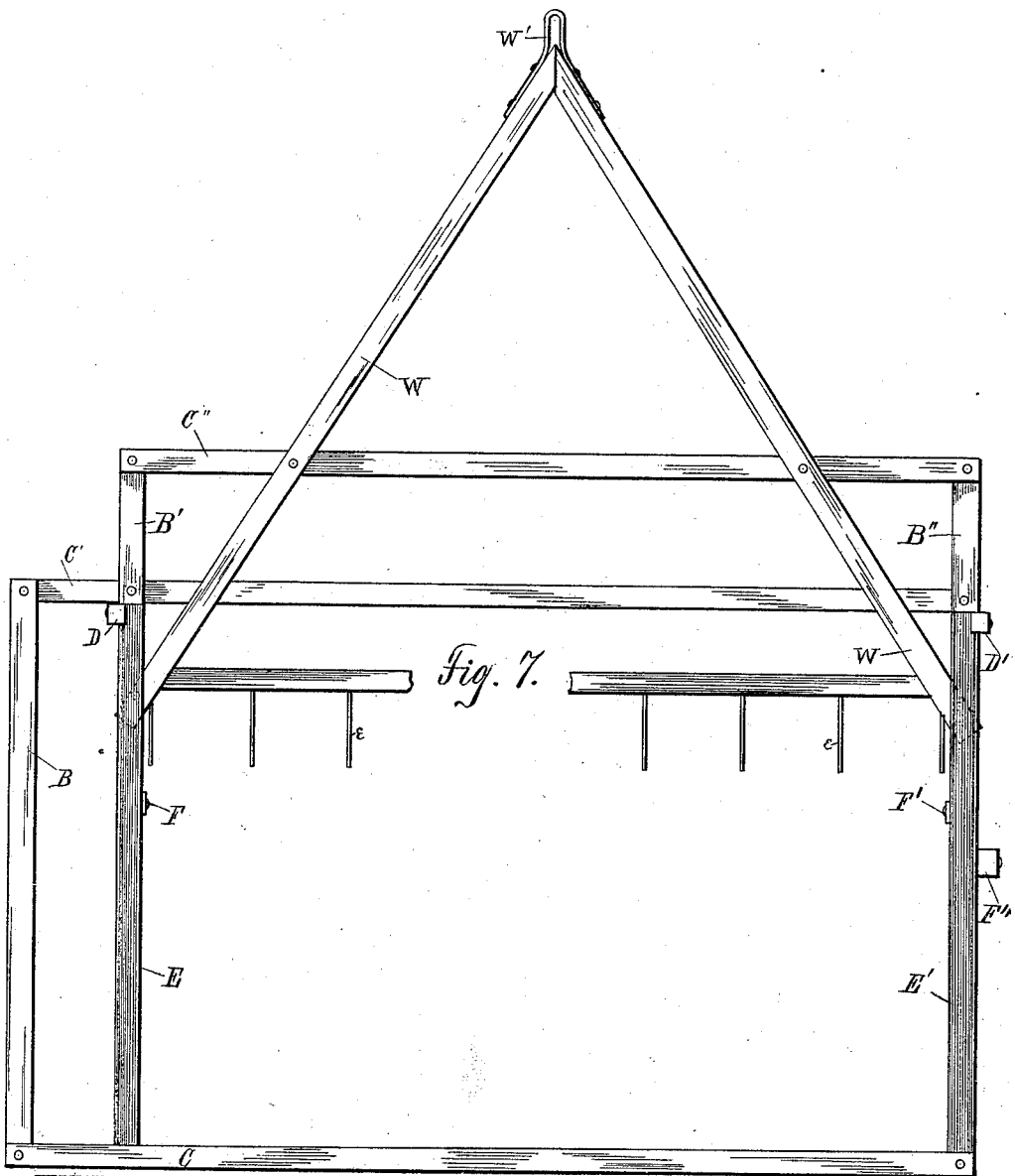

(No Model.)
C. P. SLAGHT.
HAY RAKE AND LOADER.
No. 378,466. Patented Feb. 28, 1888.
7 Sheets—Sheet 5.
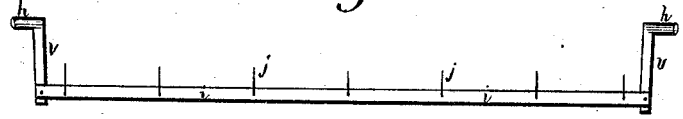
Fig. 11.
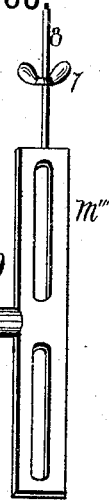
Fig. 10.
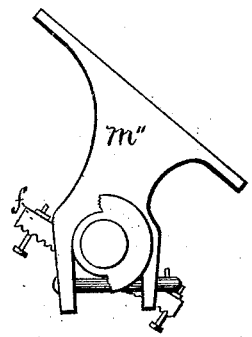
Fig. 8.
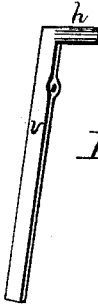
Fig. 9.
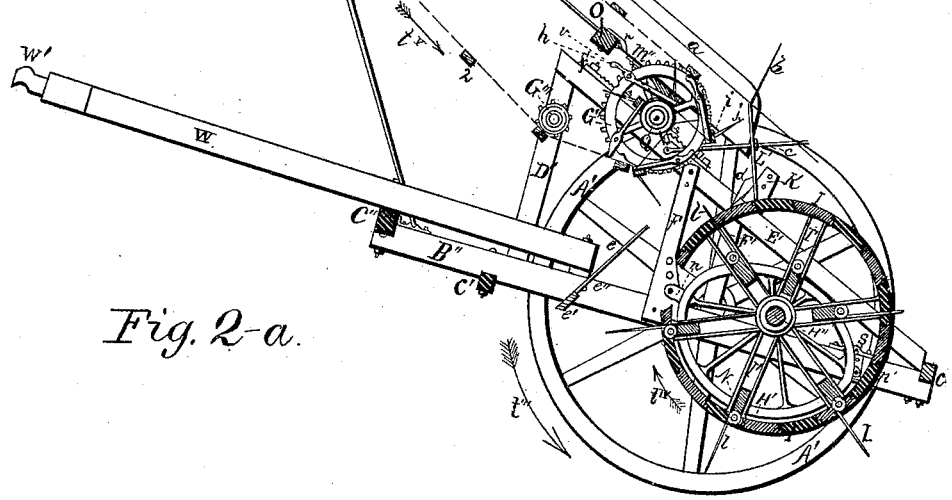
Fig. 2-a.
Witnesses,
L. D. Leasure
L. E. Chamberlin
Charles P. Slaght,
Inventor.

(No Model.) 7 Sheets—Sheet 6.
C. P. SLAGHT.
HAY RAKE AND LOADER.
No. 378,466. Patented Feb. 28, 1888.
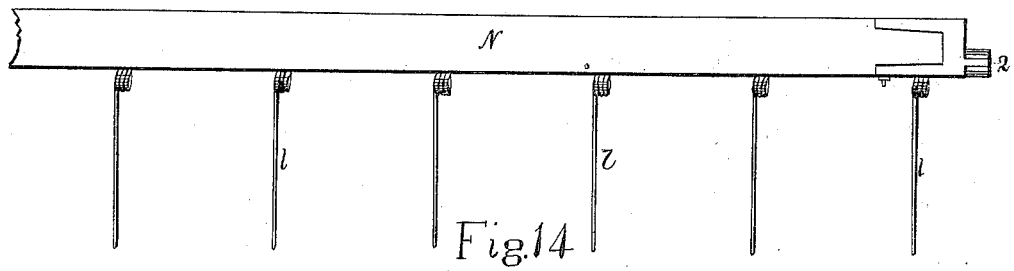
Fig. 14
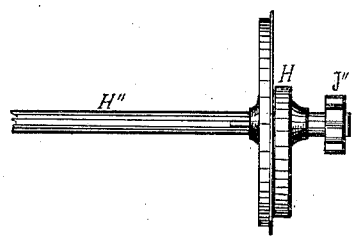
Fig. 12
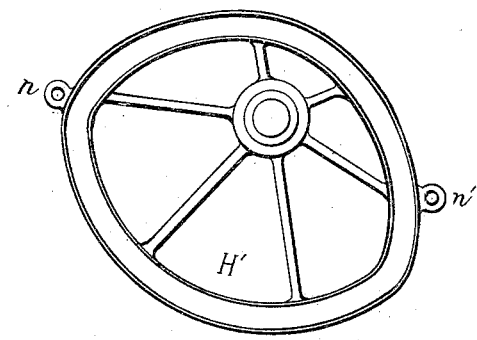
Fig. 13
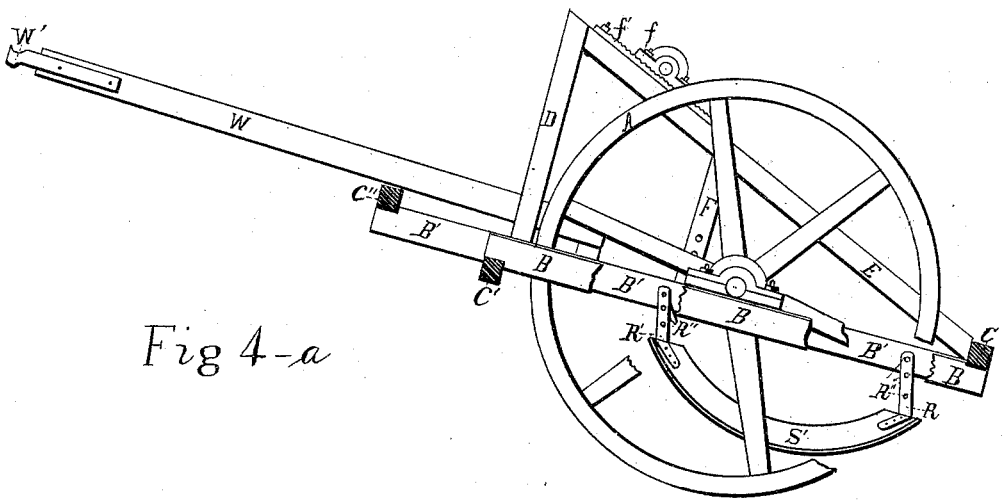
Fig. 4-a
Witnesses.
L. D. Leasure.
L. E. Chamberlin.
Charles P. Slaght
Inventor.
N. PETERS. Photo-Lithographer, Washington, D. C.

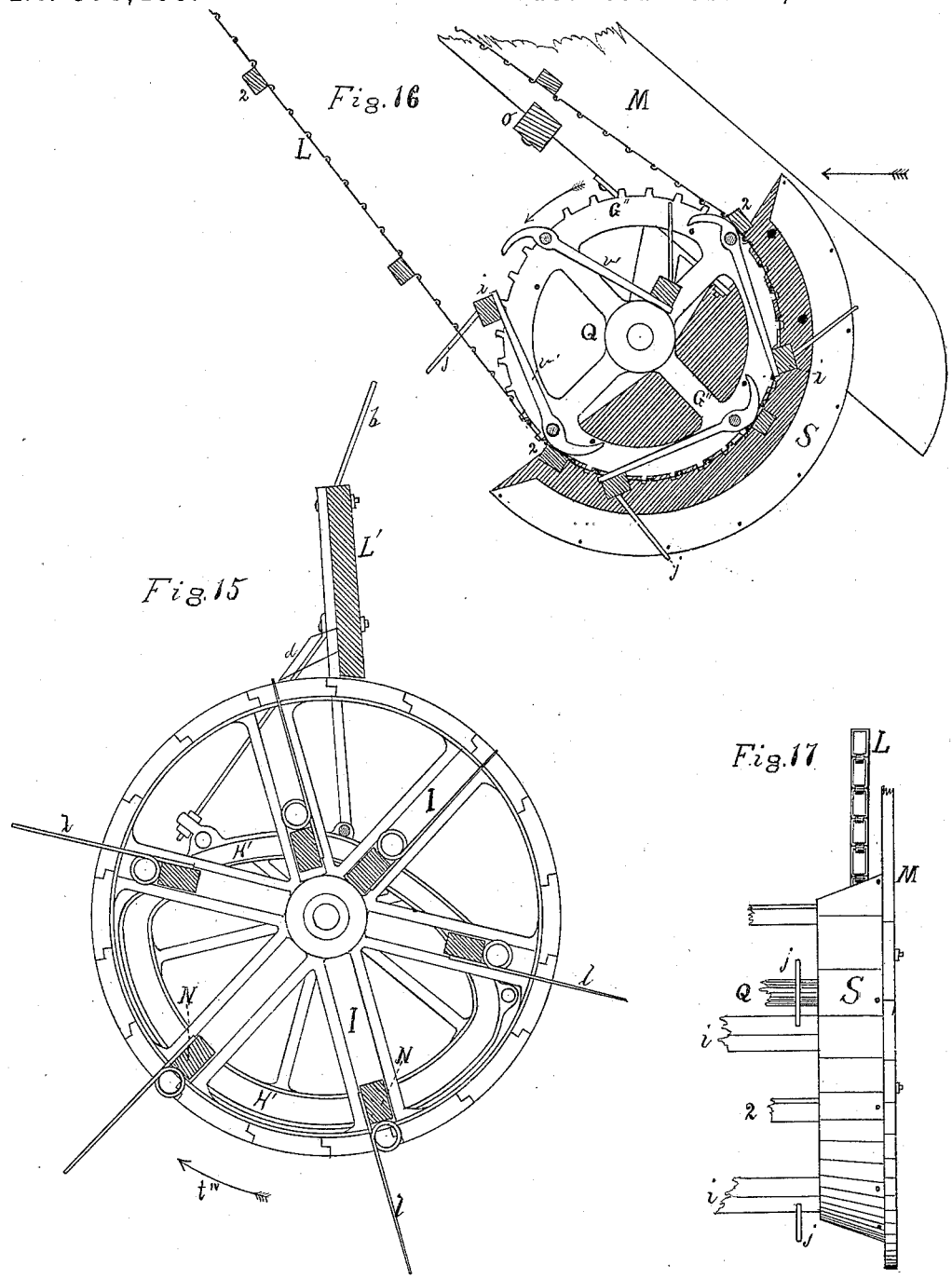

UNITED STATES PATENT OFFICE.

CHARLES P. SLAGHT, OF IOWA CITY, ASSIGNOR OF ONE-THIRD TO LOUIS E. CHAMBERLIN, OF TIFFIN, IOWA.

HAY RAKE AND LOADER.

SPECIFICATION forming part of Letters Patent No. 378,466, dated February 28, 1888.

Application filed May 29, 1885. Serial No. 167,009. (No model.)

*To all whom it may concern:*

Be it known that I, CHARLES P. SLAGHT, a resident of Iowa City, in the county of Johnson and State of Iowa, have invented certain new and useful Improvements in Hay Rakes and Loaders; and I do hereby declare the following to be a full, clear, and exact description of the invention, such as will enable others skilled in the art to which it pertains to make and use the same.

My invention relates to improvements in combined hay rakes and loaders, or machines adapted to be coupled to the rear of a wagon, and when drawn with a wagon over a surface covered with hay to take up the same, elevate it from the ground, and deposit it on the wagon.

The construction of the machine embodying my improvements is fully described and explained in this specification and shown in the accompanying drawings, in which—

Figure 4:
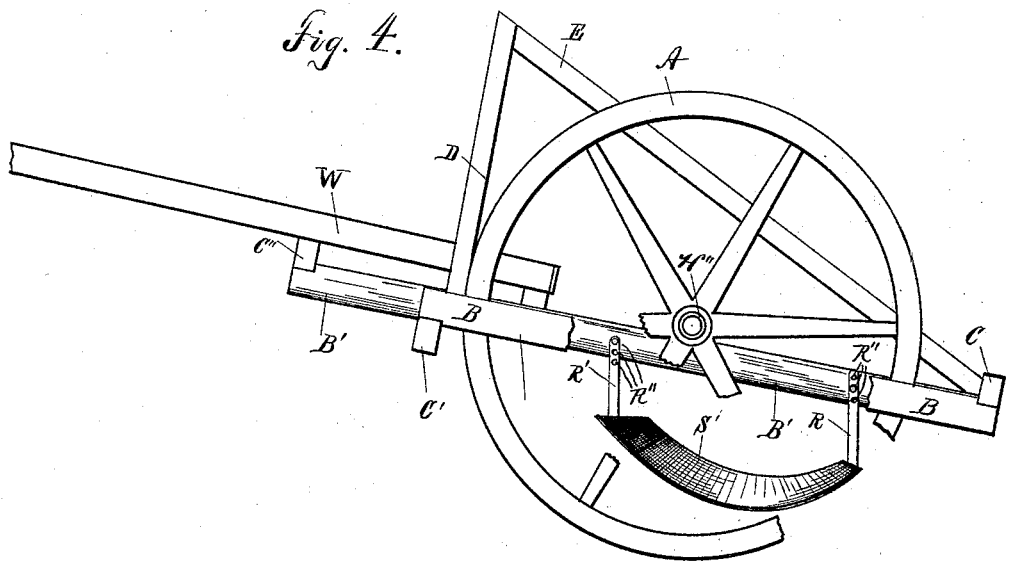
Figure 3:
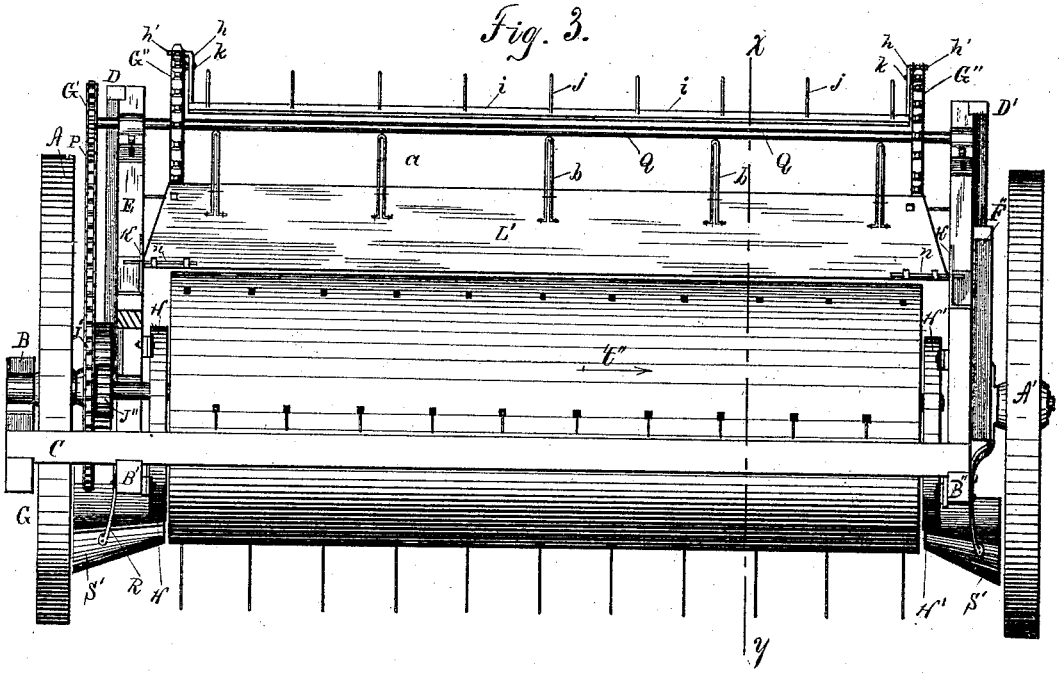

Figure 1 is a side elevation of the machine, the drive-wheel A being partially broken away to show the parts behind it, and the elevator-box being broken, the upper end of the elevator being shown in Fig. 1ª; Fig. 2, a vertical section of the machine through the line $x$ $y$, Fig. 3, looking in the direction indicated by the arrow $t$, Fig. 3. Fig. 3 is a rear elevation of the machine with the elevator-box and elevator removed; Fig. 4, a partial side elevation of the machine, showing the position of the divider S' with reference to the wheel; Fig. 5, a plan of one-half of the elevator, looking in the direction indicated by the arrow $t$, Fig. 1; Fig. 6, a side elevation of the part of the elevator shown in Fig. 5, looking in the direction indicated by the arrow $t'$, Fig. 5; Fig. 7, a plan of the main frame of the machine. Fig. 2ª is a view similar to Fig. 2, showing the entire elevator attached, with the endless carrier in position; Fig. 8, an enlarged view of the bracket M'', also showing a broken view of the boxing $f$, on which it is pivoted; Fig. 9, an enlarged view of rocking lever; Fig. 10, an enlarged view of plate M''', showing the gudgeon on which the sprocket-wheel revolves and the tightener-rod 8; Fig. 11, a detached view of a pair of rocking levers with the rake-bar $i$ with the teeth $j$ attached. Fig. 4ª is a similar view to Fig. 4, but showing the post F, half of the tongue, the slotted notched plate $f'$, and boxing $f$. Fig. 12 is a detached view of part of the cylinder-shaft H'', as seen when looking from the front of the machine, with the cylinder-head, the cam H, and the spur-pinion J'' attached. Fig. 13 is an enlarged view of the cam H'; Fig. 14, an enlarged view of part of the rake-head. Fig. 15 is an enlarged view of a portion of the cylinder and cam, showing the method of attaching the stop-board L to the cam, instead of to the frame of the machine. Fig. 16 is an enlarged view of the wheel G'', showing a modification of the tilting levers, in which they are operated and held in place by the slats 2, instead of the chain L. Fig. 17 is an enlarged view of the shield S, covering the wheels G'', as seen when looking from the rear of the machine, and shows the manner of its attachment to the side-boards M, and the office it performs in covering the wheels G'' G''.

B B' B'' are the longitudinal or side timbers, and C C' C'' the cross-timbers, of the main frame or foundation of the machine, and W W are the converging timbers of a tongue bolted rigidly to the bed, and provided with an eye, W', for coupling the tongue to a wagon in front of the machine. Directly over the timber B' is an upwardly-inclined timber, E, whose rear end rests on the timber B', while its front end is considerably elevated and is supported by two posts, D F, bolted to the timber E at the top and at the bottom to the bed of the machine. A timber, E', parallel to the timber E, is secured directly over the timber B'', and is supported by three posts, D' F' F'', which are fastened rigidly to the bed. Between the side timbers, B B', and preferably midway between the cross-timbers C C', is placed one of the wheels A of the machine, the axle of the wheel being journaled in suitable boxes attached to the upper surfaces of the timbers B B', and the wheel being rigidly attached to the axle. Between the wheel A and the timber B' is a sprocket-wheel, J', rigidly fastened to the axle of the wheel A, which passes through its center, and a spur-gear, J, concentric with the sprocket-wheel, is fastened rigidly to the inner face thereof, or to the axle.

The wheel A is the drive-wheel of the machine, and as the machine moves forward the drive-wheel, the sprocket-wheel J', and the spur-gear J turn together in the direction indicated by the arrow t''', Fig. 1.

On the opposite side of the machine from the wheel A is a supporting-wheel, A', placed outside the main frame and mounted on a stationary gudgeon, which is fastened to the post F''' and the side timber B'', and this supporting-wheel A', together with the drive-wheel A, forms the support of the machine and affords a means of transporting it from place to place. Just within the inner face of the side timbers B' B'' are vertically-adjustable cams H H', provided with the ears $n$ $n'$, projecting from its front and rear extremes, by means of which they are fastened to the frame. Of these two cams, one, which is designated by the letter H, is shown in Fig. 1, and is fastened to the side timber B' and the post F, which is attached thereto; and the other cam, H', is shown in Fig. 2, and is fastened to the timbers B'' and the corresponding post F'. On each of the timbers B' B'' is fastened a plate, S, Fig. 2, through which are a series of bolt-holes for varying the position of the corresponding ear of the cam, the ear being pierced by a single bolt-hole, which may be brought opposite either hole of the plate S. The other ear of the cam is fastened by a bolt to the posts F F', the posts being pierced by a series of holes for the same purpose as the plates S. Both ends of each of the cams H H' may thus be raised at once, whereby the successive positions of each cam are kept parallel with each other, and each ear of the cams may be kept at the same relative height above the lower side of the main or bed frame of the machine.

Through both the cams H H' passes a horizontal shaft, H'', which is journaled in and supported by the cams, the hub of the cam forming a boxing in which said shaft revolves, as shown in Fig. 12, and on one end of said shaft is rigidly fastened a spur-pinion, J''', engaging with the spur-gear J, already mentioned. On the shaft H'' are rigidly mounted two heads, each consisting of a central hub and a series of slotted radial arms, I', and on these heads is rigidly fastened a cylindrical shell, I, the heads and the shell forming a cylinder concentric with the shaft H'' and of a length slightly less than the distance between the cams H H'. Within the cylinder are a series of rake heads or bars, N, Figs. 2 and 14, corresponding in number to the arms in each of the cylinder-heads. Each rake-head lies in one of the radially-slotted arms of one cylinder-head and at the other end in the similarly-placed arm of the opposite head. Each end of each rake-head is provided with a preferably cylindrical point, 2', Fig. 14, projecting outward beyond the cylinder-head and entering the corresponding cam H or H', and on each of the rake-heads are mounted a suitable number of coil-spring rake-teeth, $l$, which project through corresponding perforations of the shell I.

The lower half of each of the cams H H' is an arc of a circle concentric with the cylinder I, while the upper half is a curve considerably flatter than the arc.

It is evident that as the wheel A turns in the direction indicated by the arrow t''', Fig. 1, the cylinder I turns in the opposite direction, (indicated by the arrow $t^{iv}$, Fig. 2;) that as the cylinder rotates the rake-heads N, lying in the radially-slotted arms I', must rotate with it, and that as they rotate the rake-heads must follow the cams H H', and thus be forced inward and outward with reference to the axis of the cylinder. The form of the cams, as already explained, is such that the rake-heads lie just within the shell of the cylinder during the lower half of each revolution about the axis, and are considerably nearer the center during the upper half of the rotation. The length of the rake-teeth is such that when the rake-heads are farthest from the axis of the cylinder the ends of the teeth reach nearly to the ground below the cylinder and are in position to rake through the stubble and carry the hay up the forward side of the cylinder to the elevator, and when the rake-heads are nearest the axis the teeth are drawn wholly inside the outer surface of the shell I, and are therefore withdrawn from the hay they carry up.

Referring again to the cams H H', I have shown cams similar to these in my Patent No. 334,093, for improvements in hay rakes and loaders, issued January 12, 1886; but in that case the cams were vertically adjustable at the front extreme only, while the rear extreme of each of said cams was pivoted on a stationary point or gudgeon. As the cams in that machine were raised and lowered at the front extreme only, it is evident that if the front end of the cam were situated at a point where it would cause the rake-teeth to be withdrawn from the hay just in front of the stop-board L', if it were raised much above that point, (to get the rake-teeth farther from the ground,) the rake-teeth would not be withdrawn in time to pass under the stop-board L'; and if lowered much below the given point (to let the rake-teeth nearer the ground) it would cause the rake-teeth to draw out of the hay before fully delivering it to the elevator; but with the adjustment of the rear and front extremes of the cams, as here shown in Fig. 2ª, by means of the ears $n$ and $n'$, that difficulty is entirely obviated, and a regular delivery of the hay at the foot of the elevator is secured at whatever height the cams may be placed. The adjustability of the cams shown herein is not broadly new, therefore; but the manner of adjustment at both ends I believe to be novel.

On the upper surface and near the upper end of each of the oblique timbers E E' of the main frame is bolted a longitudinally-slotted plate, $f''$, Figs. 5 and 4ª, and on each of said plates is bolted a box, $f$, the bolts which secure the box in place passing through the slots in the corresponding plates $f'$. The slots in the plates $f''$ permit adjustment of the boxes with reference to the plates, and the contactfaces of the plates and boxes are transversely corrugated to insure the stability of their connection at any point the box $f$ may be placed. In the boxes $f$ is journaled a transverse horizontal shaft, Q, on one end of which is rigidly mounted a sprocket-wheel, G', lying in the vertical plane of the sprocket-wheel J' and connected with it by a sprocket-chain, P. On the boxes $f$, by means of the bracket M''', Figs. 1 and 8, is pivoted a forward-extending elevator, consisting of two parallel side boards, M, two side bars, M', fastened rigidly to the outside of the side boards, M, (the lower edges of the two being on a corresponding line,) for the purpose of strengthening and stiffening them, a series of cross-bars, O O' O'', connecting the side boards, and two brackets, M''', fastened to the lower edges of the side bars near their lower ends and pivoted on the adjustable box $f$; and as the boxes $f$ may be moved up or down on the plate $f''$, therefore the whole elevator may be moved to or from the cylinder to admit the passage of light or heavy hay or windrows.

The side bars, M', lie above and in a vertical line with the inner faces of the timbers E E'. Near the inner face of each of the side boards, M, is rigidly mounted on the shaft Q a sprocket-wheel, G'', the two sprocket-wheels G'' being of the same form and diameter. On the lower face and near the upper end of each of the side bars, M', is a longitudinally slotted plate, M'''', fastened to the bar M' by bolts passing through the slots, and provided with an inwardly-projecting gudgeon, Fig. 10, on which is loosely mounted a sprocket-wheel, G$^{IV}$. Each of the plates M'''' has at its upper end a screw-threaded rod, 8, engaging with a wing-nut, 7, by means of which the plates may be longitudinally adjusted for the purpose of increasing or decreasing the distance between the sprockets G'' G$^{IV}$. Over the two sets of sprocket-wheels runs an endless-chain elevator consisting of two endless chains, L, and a series of cross-slats, 2, connected with the chains and extending at right angles across the bed of the elevator.

On the inner faces of each of the sprocket-wheels G'' are a series of gudgeons, $k$, Fig. 6, and on each of said gudgeons is pivoted a rocking lever, V, Figs. 2, 2$^a$, and 6. The levers on the two sprocket-wheels are correspondingly placed, and to the longer ends of each pair of levers is bolted a bar, $i$, Figs. 2 and 11, having teeth $j$ projecting outward from the shaft Q. On the outer faces and extending at right angles from the shorter end of the lever V is a finger, $h$, lying in the plane of the corresponding chain, L.

During the forward half of each rotation of the sprocket-wheels G'' the fingers $h$ of each pair of levers are free from the pressure of the chains, and the weight of the bar $i$ causes it to drop in toward the shaft Q, drawing the points of the teeth inside the outer rim of the sprocket-wheels; but for the remainder of the rotation the fingers $h$ are held under the endless chains L against the rims of the sprocket-wheels, thus throwing the teeth outside the circle of the sprocket-wheels G''. The teeth of each bar are projected farthest from the shaft Q when passing about the lower rear half of the sprockets G'', and are therefore in position to catch into any hay that may be in front of the stop-board L' and carry it to the upper fold of the elevator, where they automatically drop out of the hay as soon as the chain L releases the fingers $h$. When the chain releases the fingers $h$ of the rocking levers, the longer ends of the levers dropping back toward the center causes the short end with the finger $h$ to rise outside of the rim of the sprocket-wheel G'', so that when the chain catches it again near the under side of the sprocket G'' it forces it against the rim of the wheel, thus tilting the longer end with the bar $i$ outside the rim, with the teeth $j$ in position to take up the hay. These levers are intended to work automatically; but in case of green grass or badly-tangled hay, where they might not drop out of the hay, I have connected the pairs of levers opposite each other, as shown in Fig. 2, with a small cord at their longer ends, and this cord is of such length that as the lever at the lower part of the wheel G'' is caught by the chain and the longer end forced outside the rim it pulls with it (by the connecting-cord) the upper or opposite bar, $i$, with the teeth $j$, out of the hay, thus making the movement positive as well as automatic.

On each of the posts D D' of the main frame of the machine, near their upper ends, on the inner faces, on a suitable bolt which passes through said posts, are loosely mounted two sprocket-wheels, G''', which are in the vertical plane of the sprocket-wheels G''. When using connecting-cords to the opposite pairs of rocking levers for the purpose of making their action positive as well as automatic, the endless carrier-chain is placed over the under side of these sprocket-wheels, Fig. 2$^a$, for the purpose of keeping these chains from catching the finger $h$ of the lower lever too soon, and thus pulling the teeth of the upper lever out of the hay before it reaches the upper fold of the elevator. When the rocking levers V are used without a cord connection, the sprocket-wheels G''' are removed.

While the rocking levers V are made with a finger $h$, which lies in the plane of the endless chains L, and by means of said finger the chains hold them in place in their rear and upward movement, they are not indispensable, as the same object can be attained by making the levers without any finger and placing slats 2 of the endless elevator at such distances apart that in their revolutions around the sprocket-wheels G'' they will each in turn catch the shorter end of the lever and press it down in line with the rim of the sprocket-wheels, as shown in Fig. 16, and hold it there in the same manner as is done by the chains L, and perhaps much more conveniently.

The front end of the elevator may be set at any height desired by means of the braces N', hinged below to the frame of the machine, and having notches $g$, which engage with loops 3 on the side bars of the elevator. To guard against accidental disconnection of the loops 3 from any given notch of the braces N', springs 4 are fastened to the side board and press against the back or straight edge of the braces on the corresponding sides of the machine. (See Fig. 1.) As the rotation of the cylinder I raises the hay from the ground (by means of the teeth $l$) and brings it forward and upward, the hay is held against the face of the cylinder by a hinged board, E, Figs. 1, 2, hung on the pivots E' on the inner faces of the timbers B' B'' of the main frame. The board, which may be solid or formed of slats, is hinged near its lower edge, and the weight of the upper part causes it to drop inward toward the cylinder, and thus prevent the scattering of the hay. A stop, E'', on each of the timbers B' B'' prevents the board from dropping too far and striking the cylinder.

As the hay after leaving the hinged board E approaches the top of the cylinder I and comes within reach of the teeth $j$, there is a strong tendency for it to pass completely over the cylinder and drop behind the machine. To prevent this there is mounted just above the cylinder a nearly-vertical stop-board, L', provided with a series of wire fingers, $d$, Fig. 2, which touch the cylinder and are susceptible of vertical adjustment by means of a series of bolt-holes in the feet K, one on each side of the machine, to which it is hinged, and of adjustment backward or forward by means of a long bolt and nut, $c$. This adjustability is necessary in order that it may correspond with the varying positions of the cams H H' and the cylinder, and the same results may be attained by fastening the supports of the stop-board to the cams themselves, as shown in Fig. 15. On the upper edge of the stop-board L' are fastened a series of upward-extending loops or staples, $b$, in each of which lies the rear end of a long rod, $a$, extending forward beyond the front end of the elevator.

From their rear ends forward the rods $a$ converge rapidly, (see Fig. 5,) and near their front ends they are fastened to a cross-bar, $g'$, Figs. 1, 2ª, 6, 7, the cross-bar being connected to the side boards, M, by hinged links 6, and the rods and cross-bar together by their weight, pressing on the hay as it passes up the elevator, constitute a condenser adapted to press the hay toward the center of the machine as it is carried forward by the elevator.

The connection of the cross-bar $g'$ and the side boards, M, permits vertical adjustment of the bar, and thus of the entire front end of the condenser, and the staples $b$ permit free vertical but not lateral movement of the rods $a$ independently of each other. The condenser, already described, is just above the upper fold of the endless elevator, and is (as can be readily seen) self-adjusting, always varying its distance from the endless elevator with the amount of hay being carried up, and preventing any hay from being blown away on its passage to the load. Under said upper fold is a stationary condenser consisting of a series of rods, $p$, Fig. 5, fastened to the cross-bars O O'' of the elevator-frame and converging from rear to front. As the hay rests on these rods on its passage up the elevator, and as the rods $a$ are placed over and rest on the hay midway between the rods $p$, Fig. 5, they help to press the hay down and make it sag between the rods $p$, and the hay as it passes up is thus condensed or guided toward the center of the machine. The front end of each of the rods $p$ is turned downward and backward and hooked over a plate, $q'$, fastened to the front cross-bar, O'', and the rear end of each rod is passed through the rear cross-bar, O, and held by a nut, $p'$. Over the nuts $p'$, which secure the ends of the rods $p$, is fastened to the cross-bar O a shield, $r$, Fig. 6, to prevent the hay from catching on the end of the rod, and the form of fastening employed for the front ends of said rods has been devised with special reference to the same object.

It is exceedingly important in a machine of this class to guard against the clogging of the machine by the hay, and I have endeavored to avoid that difficulty as far as possible in every part of the structure shown. For this purpose I have placed over each of the sprocket-wheels G'' a shield, S, fastened to the corresponding side boards, M, and of such a form (preferably frusto-conical) as to turn the hay away from the wheel and prevent its dropping on the axle and winding up, and it is for the same purpose that each of the rods $a$ of the upper condenser has at its point of attachment to the cross-bar $g'$ an upward bend, $a'$, Figs. 2ª, 6, by means of which the lower surface of the cross-bar is far enough above the rod to prevent the hay under the rod from striking the cross-bar.

Between each of the wheels A A' and the end of the cylinder I hangs a guard or divider, S', Figs. 1, 3, and 4, which extends very nearly to the wheel on the one side and to the cylinder on the other. In form this divider is preferably a segment of a hollow conical frustum, the greater diameter being next the wheel and the smaller next the cylinder. The smaller end of the divider is of such size and form as to coincide substantially with the arc of the cylinder, and the divider is so placed that the smaller end thereof is at the same height as the lower edge of the end of the cylinder, Fig. 3. The office of the divider is to prevent the hay as it is caught by the rake-teeth $l$ from drawing up and bunching between the wheel and the cylinder and thereby clogging the machine. In short or light hay no difficulty of this kind is met with; but in long heavy hay the teeth $l$ are likely to draw hay from a line outside the path of the wheels A A', and without some effective device to separate this hay from the outside mass the machine is always liable to clog or choke. The divider S' is adapted by its form and location to prevent bunching, and at the same time force the hay toward and onto the cylinder, where it is at once carried up to the elevator. Each of the dividers is hung to the side timbers of the main frame by means of links R R', Fig. 4, attached to its ends. Both of the dividers are made vertically adjustable by having the links R R' pierced with a suitable number of holes, R'', so that the dividers may be raised or lowered to conform to the height at which the cylinder I may be placed.

The operation of the machine above described is, perhaps, sufficiently evident; but I will briefly recapitulate it. As the machine moves forward, the cylinder I rotates in the direction indicated by the arrow $t^{IV}$, Fig. 2, carrying the rake-heads N with it, and forcing them alternately in and out with reference to the shaft of the cylinder, each rake-head being farthest from the shaft when below the axis of the cylinder. When below the axis of the cylinder, the rake-heads and their teeth $l$ move forward, taking the hay from the ground and carrying it forward and upward, the hay thus elevated being separated from the mass at either side by the dividers S'. The teeth $l$ carry the hay upward until it reaches the stop-board L' and comes within reach of the teeth $j$ of the bars $i$. The rotation of these bars lifts the hay to the level of the upper fold of the endless elevator L, and the motion of the elevator carries the hay forward and drops it on the wagon, the hay in its progress up the elevator being guided toward the center of the elevator by the upper condenser-rods, $a$, and the lower condenser-rods, $p$.

Having now described my invention and explained its operation, what I claim as new, and desire to secure by Letters Patent, is—

1. The combination, with the rotating raking-cylinder in a hay rake and loader, of two stationary dividers hung in proximity to the ends of the cylinder, each of said dividers being smaller at its inner end next the cylinder than at its outer end, and the inner end being curved to approximate an arc of the circle of the cylinder, and hung at such height as to correspond substantially with the position of the lowest arc of the cylinder end, substantially as shown and described, and for the purpose set forth.

2. The combination of the vertically-adjustable cylinder I, the dividers S' S', hung in proximity to the ends of the cylinder, and formed substantially as shown and described, and means, substantially as shown and described, for raising and lowering said dividers to correspond with the adjustment of the cylinder, substantially as and for the purpose set forth.

3. The combination, with the rotating raking-cylinder I, of the stop-board L', adapted to prevent the carrying of the hay raised by the cylinder beyond the point desired, together with the means, substantially as shown and described, for adjusting said stop-board, and thus changing its position with reference to the cylinder.

4. The combination, with the vertically-adjustable raking-cylinder I, of the stop-board L', placed above said cylinder, the rod $c$, adapted to adjust the stop-board backward or forward with reference to the body of the machine, and the means shown and described for changing the vertical position of the board with reference to the foot K, to which each end is pivoted, substantially as and for the purpose set forth.

5. The combination of the cylinder I, the stop-board L', and the fingers $d$, fastened to the front of the stop-board and extending forward along the surface of the cylinder, substantially as shown and described, and for the purpose set forth.

6. The combination, in a hay-loader, of a rotating raking-cylinder, a stop-board above the cylinder adapted to prevent the carrying of hay over the cylinder, an endless elevator adapted to take the hay from the cylinder and carry it forward and discharge it, a compressor or condenser above said elevator consisting of a series of rods whose front ends are fastened to a vertically-adjustable cross-bar, and a series of guides fastened to said stop-board and corresponding in number to said condenser-rods, each of said guides being adapted to permit vertical but not lateral motion of the rear end of one of said rods, substantially as shown and described, and for the purpose set forth.

7. The combination of the cylinder I, the stop-board L', the sprocket-wheels G'' G$^{IV}$, an endless elevator, L, the rods $a$, and cross-bar $g'$, and the staples $b$, secured to the stop-board L' and regulating the movements of the free ends of the rods $a$, substantially as shown and described, and for the purpose set forth.

8. The combination of the side boards, M, sprocket-wheels G'' G$^{IV}$, endless elevator L, the cross-bar $g'$, hinged links 6, the rods $a$, staples $b$, and stop-board L', substantially as shown and described, and for the purpose set forth.

9. The combination of the sprocket-wheels G'' G$^{IV}$, the endless chains L, running over said sprocket-wheels, suitable slats fastened to said chains to form an endless hay-carrying elevator, a series of rocking levers V, pivoted to each of the sprocket-wheels G'' G'' and arranged in corresponding positions on the two wheels, a series of slats, $i$, extending from one series of levers to the other and fastened to the corresponding levers of each set, and means, substantially as shown and described, whereby said slats are alternately thrown outward from the axis of the wheels G'' by the chains L, and drawn inward toward said axis by their own weight, substantially as shown and described, and for the purpose set forth.

10. The combination of the sprocket-wheels G'' G$^{IV}$, the chains L, the levers V, rocking on pivots $k$, the slats $i$, fastened to the ends of the levers, the teeth $j$, set on said slats, and the fingers $h$, formed on the levers and adapted to engage the chains L, substantially as shown and described, and for the purpose set forth.

11. The combination, with the side boards, M, cross-bars O O″, sprocket-wheels G″ G$^{IV}$, and endless elevator L, of the rods $p$, converging from rear to front, fastened at their front ends to the cross-bar O″ and passing through the cross-bar O, or an attachment thereof, together with nuts engaging the ends of said rods and adapted to draw them tight, substantially as shown and described, and for the purpose set forth.

12. The combination of the cross-bars O O″, the rods $p$, bent downward at their front ends, the plates $q'$, fastened to the cross-bar O″, and engaging the ends of the rods $p$, and nuts on the rear ends of the rods for tightening the same, substantially as described and shown, and for the purpose set forth.

13. The combination, with the main frame of the machine, of the cams H H′, attached to the opposite sides of the said frame by means, substantially as shown and described, adapted to permit vertical adjustment of both ends of each of said cams, substantially as shown and described, and for the purpose set forth.

14. The combination of the main frame of the machine, cams H H′, fastened to said frame by means adapted to allow vertical adjustment of both ends of each cam, the shaft H″, journaled in said cams, the cylinder I, fastened to and rotating with said shaft, and the rakes N, rotating with said cylinder, but thrown in and out with reference to the shaft by the cams H H′, substantially as shown and described, and for the purpose set forth.

In testimony whereof I have signed this specification in the presence of two subscribing witnesses.

CHARLES P. SLAGHT.

Witnesses:
L. E. CHAMBERLIN,
L. D. LEASURE.